United States Patent [19]
Meyers

[11] 3,807,838
[45] Apr. 30, 1974

[54] COLOR VISION PHOTOMETER
[75] Inventor: Siegfried S. Meyers, Harrisonburg, Va.
[73] Assignee: Madison College Foundation, Inc., Harrisonburg, Va.
[22] Filed: Jan. 10, 1973
[21] Appl. No.: 322,551

[52] U.S. Cl............ 351/36, 351/17, 351/35, 356/178, 356/195, 356/206, 304/231
[51] Int. Cl............................... A61b 3/06
[58] Field of Search............ 351/1, 35, 36; 356/173, 356/174, 178, 229, 230, 1, 195, 204

[56] References Cited
UNITED STATES PATENTS
2,916,963  12/1959  Bouman....................... 356/230 X OTHER PUBLICATIONS
Wald, G., "Human Vision and the Spectrum," Science, Vol. 101 (1945) p. 653 et seq.

Danford, V., Lockeheed Tech. Note 76-14, "Low Level Illumination System," Dec. 13, 1966, 8 pages.

Primary Examiner—Ronald L. Wibert
Assistant Examiner—R. J. Webster
Attorney, Agent, or Firm—Mason, Fenwick & Lawrence

[57] ABSTRACT

A color vision photometer having two lamps controlled by a subject's variable resistor and a supervisory operator's variable resistor to vary illumination of separate, adjacent screen segments to be viewed by the subject through colored filters for testing the subject's vision response to various intensities of colored light.

10 Claims, 5 Drawing Figures

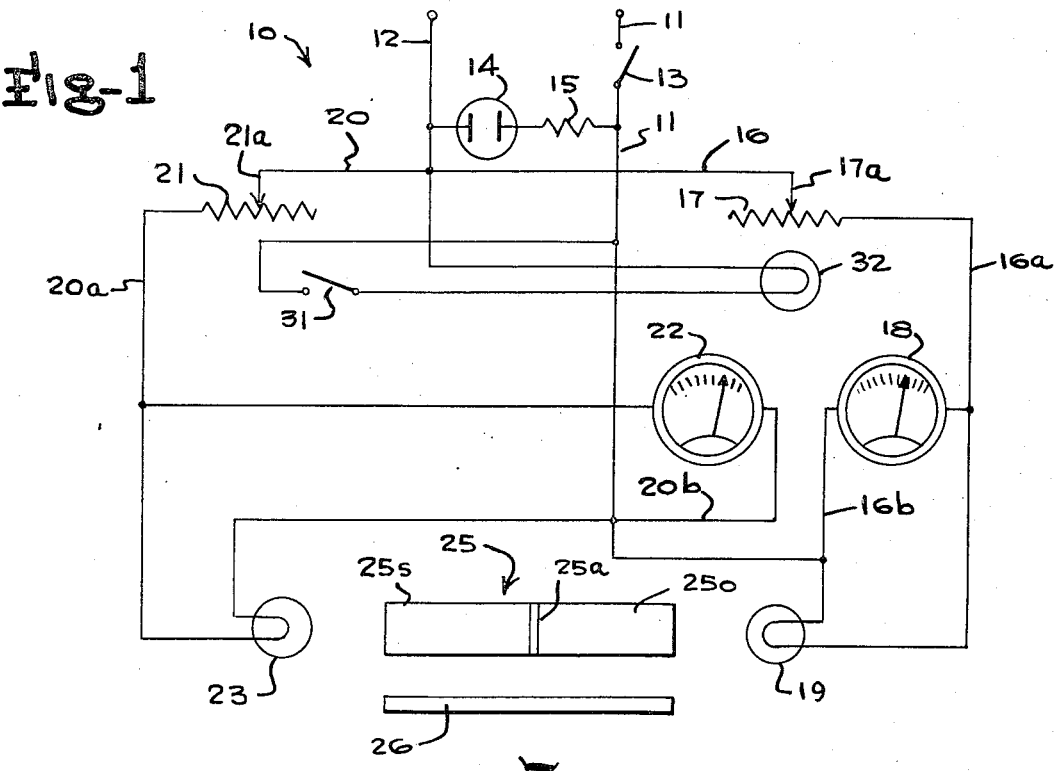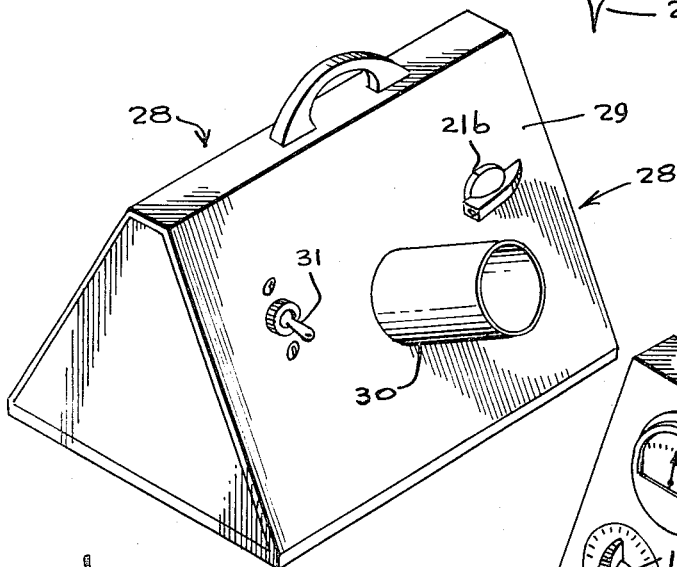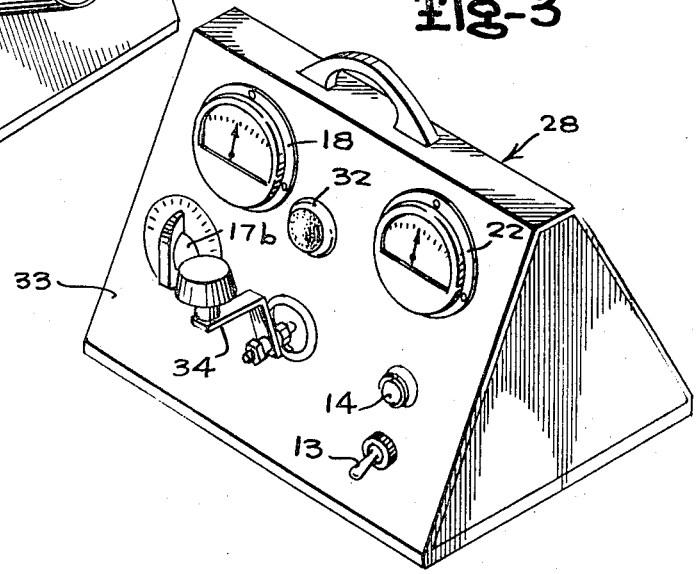

3,807,838

COLOR VISION PHOTOMETER

BACKGROUND AND OBJECTS OF THE INVENTION

The present invention relates in general to color vision photometers, and more particularly to a color photometer which is capable of directly measuring the visual color-response of a human eye.

A number of different kinds of photometers have been in use for many years, particularly in physical science laboratories, for determining the candle power of various light sources. These have frequently taken the form of light intensity measuring apparatus wherein photoelectric devices, such as photocells or phototransistors, produce variations in an electrical current having a determinable or calibrated relationship to incident light intensity and electrical measuring circuits respond to the variations in electrical current produced by the photoelectric devices for producing output indications of the candle power of the light source.

It is theorized that human visual color response may be adversely influenced by any one of several factors, such as age, fatigue, sex, influence of drugs, alcohol, eye diseases such as cataracts or glaucoma, and similar factors. It is desirable to provide a photometer device which is capable of providing measurements indicative of a subject's response to the apparent intensity of light of various colors, whereby the visual color response of the subject's eye can be accurately determined. The photometer of the present invention accomplishes this by presenting on one screen or segment of a screen a predetermined intensity of light of a selected color, as regulated by an operator or supervisor, and a subject varies the intensity of similarly colored light on another screen or screen segment in an attempt to match the predetermined color intensity on the operator's screen section.

An object of the present invention is the provision of a novel color vision photometer, wherein a subject regulates the intensity of light of selected colors on a screen segment in an effort to match the intensity of similarly colored light on another screen segment, and which provides meter readings correlated to the intensity of light illuminating the two screen segments to provide measurements indicative of the subject's color vision response.

Another object of the present invention is the provision of a device of the type described in the immediately preceding paragraph, wherein a pair of lamps separately illuminate the two screen segments in a manner such that independence of line voltage variations and aging of the lamps is provided, and which is characterized by ease of operation, and minimizing of elaborate and costly equipment.

Other objects, advantages and capabilities of the present invention will become apparent from the following detailed description, taken in conjunction with the accompanying drawings illustrating preferred embodiments of the invention.

BRIEF DESCRIPTION OF THE FIGURES

FIG. 1 is a schematic diagram of a first form of a color vision photometer, embodying the present invention;

FIG. 2 is a perspective view of the color vision photometer of FIG. 1, viewed from the subject's side;

FIG. 3 is a perspective view thereof, viewed from the operator's side;

DETAILED DESCRIPTION OF PREFERRED EMBODIMENTS

Figure 4:
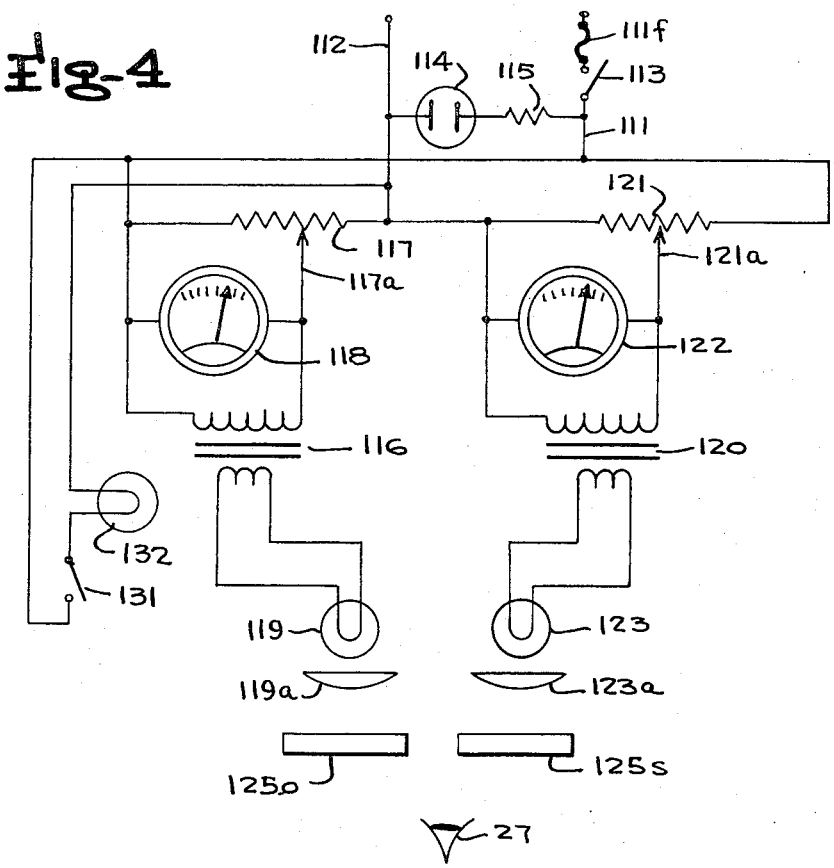
FIG. 4 is a schematic diagram of a modified form of the color vision photometer adapted for an alternating current voltage source.

Referring to the drawings, wherein like reference characters designate corresponding parts throughout the several figures, and particularly to FIGS. 1 to 3, there is illustrated in FIG. 1 a schematic diagram of the color vision photometer of the present invention, indicated in general by the reference character 10, having two supply conductors 11, 12, connected for example across a 2.5 volt battery or a rectified DC output from a transformer and rectifier unit providing an equivalent DC voltage output. A main ON-OFF toggle switch 13 is provided in one of the supply lines, for example the supply line 11 and a pilot lamp 14, such as a neon lamp and a resistor 15 are connected in series across the supply conductors to indicate when the circuit is in ON condition. A lead 16 connects to the wiper 17a of a potentiometer 17, for example a 3,000 ohm, 25 watt potentiometer connected by leads 16a to an operator's voltmeter 18, the other terminal of which is connected by lead 16b to the conductor 11. The potentiometer 17 serves as the operator's setting potentiometer, and the voltmeter 18 is connected in parallel with an adjustable white-light source 19, designated the operator's lamp, which may be for example a 2.5 volt, 250 milliamp lamp, so that the voltmeter 18 indicates the voltage being applied across the lamp.

Similarly, a branch lead 20 connects from the supply conductor 12 to the wiper 21a of the subject's potentiometer 21, which is preferably matched to the operator's potentiometer 17 and has its resistor connected by lead 20a to the subject's voltmeter 22 which is like the observer's voltmeter 18 and is similarly connected across another adjustable while-light source, forming the subject's lamp 23, which is matched to or has a similar rating as the operator's lamp 19. The terminal of the subject's voltmeter 22 not connected to the potentiometer 21 is connected by lead 20b to the other supply conductor 11. The light from both of the lamps 19 and 23 are directed onto a photometer screen 25, designed to provide two screen segments or sections, one illuminated by the operator's lamp 19 and the other illuminated by the subject's lamp 23. This provides two illuminated screen sections which are viewed through a color filter structure 26 by the eye of the subject, indicated schematically at 27.

In one example, the photometer screen 25 comprises a plastic cylinder made from clear lucite or polystyrene, which is cut or separated along a diametric plane and fitted with metal foil to define a diametric opaque wall, indicated at 25a in FIG. 1, to sub-divide the cylinder forming the screen 25 into two screen segments 25o and 25s. Each of the ends and outer surfaces of the cylinder forming the screen 25 is roughened to render them translucent to white-light. The color filter structure 26 to be interposed between the photometer screen 25 and the subject's eye may comprise three colored glass or gelatin filters, for example red, green, and blue filters, each of circular configuration corresponding substantially to the diameter of the composite cylinder forming the screen 25 and mounted on a manually rotatable disc adjacent the circumference of the disc separated about 120° from each other.

An example of the cabinet 28 for an embodiment of the photometer of FIG. 1 is illustrated in FIGS. 2 and 3, and includes a subject's panel, indicated at 29, on one side thereof illustrated in FIG. 2, having a tubular cylindrical viewing shield 30 projecting therefrom defining the opening through which the filter structure 26 and photometer screen 25 is viewed. A rotatable potentiometer control knob 21b is exposed at the panel 29, as well as a momentary or spring return signal switch 31 to be operated by the subject when he determines that an apparent match in colored light intensity has been achieved on the two segments 25o and 25s of the screen to operate a signal lamp 32 and thereby indicate to the operator when the subject believes that the color light intensity in the two screen segments is matched. As will be apparent from the schematic diagram of FIG. 1, the signal switch 31 and signal lamp 32 are connected in series across the supply conductors 11 and 12. The opposite side of the cabinet 28 serves as the operator's panel, indicated at 33 in FIG. 3, and includes the two meters 18 and 22, the toggle switch 13 and pilot lamp 14, the signal lamp 32, a rotatable potentiometer control knob 17b for the operator's potentiometer 17, and a manual control knob or lever 34 for rotating the filter structure to position any one of the three colored filters between the photometer screen 25 and the subject's eye.

In the use of the color vision photometer, the toggle switch 13 is adjusted to the ON position, and the operator adjusts the filter control knob 34 to present a particular color filter before the screen 25, for example the red filter, and the operator's potentiometer control knob 17b is adjusted to establish a selected light intensity for the lamp 23, as determined for example by reading the operator's voltmeter 18. In this manner, the subject to be tested is initially presented with a predetermined intensity of colored light, and the reading on the operator's voltmeter 18 is recorded. The subject then adjusts his potentiometer 21, to control the light intensity of his lamp 19 which is located the same distance from the potentiometer screen as the lamp 23 but is located on the opposite side of the dividing wall 25a. The subject adjusts his potentiometer control knob 21b until he judges that the two color intensities observable through the filter 26 for the two screen segments 25o and 25s appear to be matched, whereupon the subject operates the momentary or spring return signal switch 31, such as a pushbutton, to energize the signal lamp 32. The observer then reads the subject's voltmeter 22 which is connected in parallel with the subject's lamp 23. The numerical voltage difference observed between the two voltmeter readings is a measure of the color matching response of the subject's eye for the particular color presented.

The observer then readjusts his potentiometer 17 for two other successive voltage values, and again records the subject's response by observing the reading on the subject's voltmeter 22 after the subject has signaled that an apparent match in color intensity has been achieved. The average of the deviations of the subject's settings in volts from the settings of the operator's voltmeter represents a measure of the subject's response to the colored lights or of the particular color determined by the filter 26 for the subject's eye which was observing the illuminated screen 25 through the filter. The subject's other eye is tested in a similar manner for color, and then the test is repeated for a different color, for example by introducing the green filter between the screen 25 and the subject's eye, and then the test is repeated with the blue filter interposed between the screen and the subject's eye.

To initially standardize the color vision photometer, a matched control group of men and women are selected who appear to have normal color vision responses, and then field tests with matched experimetal groups may be conducted to ascertain their deviations, if any, from the control group data.

An alternative form is illustrated in FIG. 4, designed to be connected to a conventional nominal 110 volt supply source. In the form illustrated in the schematic diagram of FIG. 4, the supply conductors 111 and 112 are connected to the nominal 110 volt source and include a fuse 111f and the ON-OFF toggle switch 113 in the supply head 111 and the pilot lamp 114 and resistor 115 are connected across the supply conductors. The supply conductor 111 is then connected to one end of an operator's rheostat 117 and the subject's rheostat 121, the opposite ends of such rheostats being connected together and to the other supply conductor 112. The primary windings of stepdown transformers 116 and 120 are each connected between an end of the associated rheostat 117, 121 and the wiper 117a, 121a for such rheostats, and the secondary windings of such transformers 116 and 120 are connected to the subject's lamp 123 and the operator's lamp 119. The light from the lamps 119 and 123 is directed through the convex lenses 119a and 123a onto color filters 125o and 125s, which are similar to the color filter segments 25o and 25s of the previous embodiment but are separate filter discs in this embodiment. The circuit of FIG. 4 also has the subject's switch 131 connected in series with the signal lamp 132 across the supply leads 111, 112 to be used in the same manner as in the first described embodiment. In the circuit of FIG. 4, the resistor 115 may be a 28,000 ohm, ¼ watt resistor, the pilot lamp 114 a NE-51 lamp, the rheostats 117 and 121 and may be 300 ohm, 25 watt rheostats, the voltmeters 118 and 122 may be 0 to 150 volt AC voltmeters, the stepdown transformers 116 and 120 may be rated to reduce the voltage at the secondary to 2.5 volts, and the lamps 119 and 123 may be 2.5 volts, 250 milliamp lamps.

Figure 5:
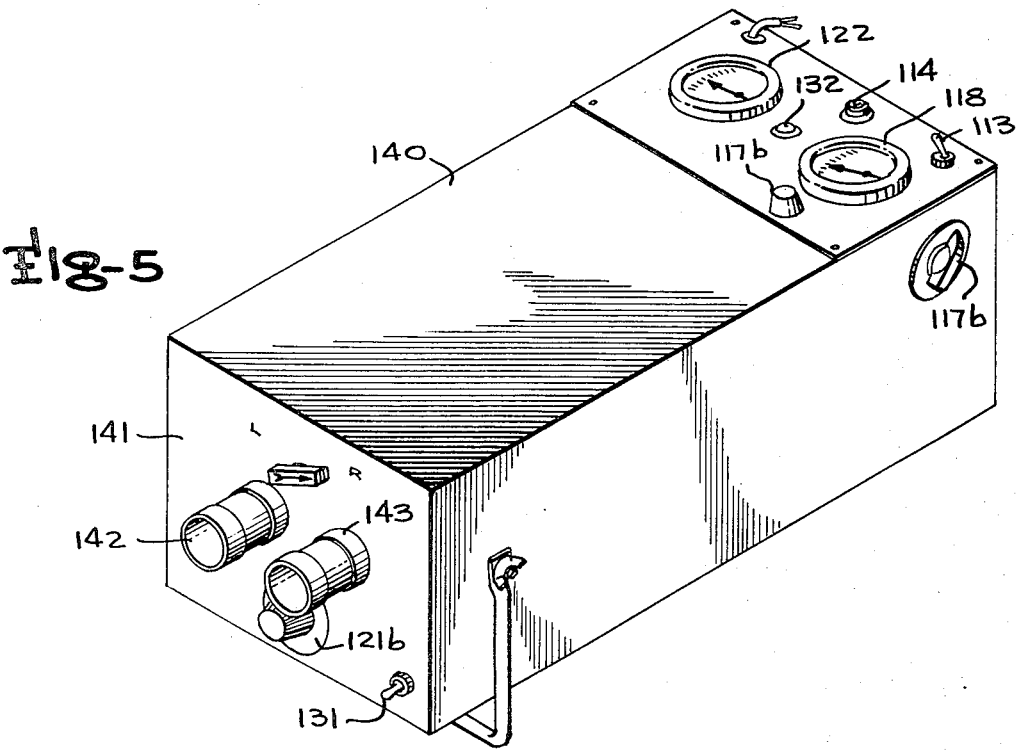
FIG. 5 is a perspective view of the device of FIG. 4, viewed from the subject's side.

The color vision potentiometer of FIG. 4 may be housed in a cabinet, such as that indicated by reference character 140 in FIG. 5, having a front panel 141 provided with an exposed control knob 121b for regulating the wiper of the subject's potentiometer 121 and having the signal switch 131 exposed for manual operation by the subject. In this embodiment, duplicate filter segments 125o and 125s may be provided for each of two sight openings associated with forwardly projecting tubular light shields 142, 143, and an opaque movable baffle may be provided to close off sight through either of the openings associated with 142, 143 to selected the subject's eye to be tested. The voltmeters, as well as the ON-OFF switch 113, the operator's control knob for the rheostat wiper 117a, the pilot lamp 114 and the signal lamp 132, are provided at a station or control panel adjacent the rear of the cabinet 140 for observation and control by the operator.

What is claimed is:

1. A color vision photometer for providing meter readings from which a human subject's vision response to different colored light intensities can be determined, comprising a pair of incandescent lamps for producing light, a pair of separated photometer screen segments to be separately illuminated by the respective lamps, a viewing station, color filter means between the screen segments and viewing station for filtering the light produced at said screen segments to present light representations of identical color at the viewing station representing the two illuminated screen segments, an electrical supply source for said lamps, a pair of manually controllable variable resistors for independent respective operation by the subject and by a supervisory operator for respectively and independently regulating the voltage supply to said lamps to vary the liqht intensities produced thereby, and a pair of voltmeters connected respectively across said lamps to indicate measured voltage values which are directly proportional to the relative light intensities produced by the two lamps.

2. A color vision photometer as defined in claim 1, wherein said pair of photometer screen segements are half-cylinder members assembled together along a common flat diametric plane of each with an opaque divider between them, and include roughened end and side surface to render them translucent to white light.

3. A color vision photometer as defined in claim 1, including a manual switch for manual activation by the subject when he judges that an apparent light intensity match has been produced at the viewing station upon the subject adjusting one of the resistors, and a signal lamp connected to the manual switch to signal the supervisory operator that the subject believes a color intensity match has been attained.

4. A color vision photometer as defined in claim 2, including a manual switch for manual activation by the subject when he judges that an apparent light intensity match has been produced at the viewing station upon the subject adjusting one of the resistors, and a signal lamp connected to the manual switch to signal the supervisory operator that the subject believes a color intensity match has been attained.

5. A color vision photometer as defined in claim 1, including a cabinet for housing the previously recited components, said cabinet including a first panel to face toward the subject having exposed thereon a manual control member for adjusting a selected one of said variable resistors assigned to the subject and a sight tube at the viewing station alined with the color filter means and screen segments for viewing therethrough of the screen segments through said color filter means by the subject, and said cabinet including a second panel to face toward the supervisory operator having exposed thereon dial portions of said pair of voltmeters and a manual control member for the other of said variable resistors.

6. A color vision photometer as defined in claim 3, including a cabinet for housing the previously recited components, said cabinet including a first panel to face toward the subject having exposed thereon a manual control member for adjusting a selected one of said variable reistors assigned to the subject and said manual switch and sight tube at the viewing station alined with the color filter means and screen segments for viewing therethrough of the screen segments through said color filter means by the subject, and said cabinet including a second panel to face toward the supervisory operator having exposed thereon dial portions of said pair of voltmeters and a manual control member for the other of said variable resistors and said signal lamp.

7. A color vision photometer as defined in claim 4, including a cabinet for housing the previously recited components, said cabinet including a first panel to face toward the subject having exposed thereon a manual control member for adjusting a selected one of said variable resistors assigned to the subject and said manual switch and a sight tube at the viewing station alined with the color filter means and screen segments for viewing therethrough of the screen segments through said color filter means by the subject, and said cabinet including a second panel to face toward the supervisory operator having exposed thereon dial portions of said pair of voltmeters and manual control member for the other of said variable resistors and said signal lamp.

8. A color vision photometer as defined in claim 1, including means for connecting said resistors across a 110 volt alternating current supply, and a pair of stepdown transformers having their primary windings connected respectively to said variable resistors for regulating the voltage applied to the transformer primaries and having their secondaries connected to said incandescent lamps to cause them to illuminate their respective screen segments.

9. A color vision photometer as defined in claim 3, including means for connecting said resistors across a 110 volt alternating current supply, and a pair of stepdown transformers having their primary windings connected respectively to said variable resistors for regulating the voltage applied to the transformer primaries and having their secondaries connected to said incandescent lamps to cause them to illuminate their respective screen segments.

10. A color vision photometer as defined in claim 6, including means for connecting said resistors across a 110 volt alternating current supply, and a pair of stepdown transformers having their primary windings connected respectively to said variable resistors for regulating the voltage applied to the transformer primaries and having their secondaries connected to said incandescent lamps to cause them to illuminate their respective screen segments.

* * * * *